Patented Feb. 16, 1937

2,070,978

UNITED STATES PATENT OFFICE 2,070,978

TREATING CRACKED PETROLEUM DISTILLATES

John P. Smoots, Shaker Heights, Ohio, assignor to The Standard Oil Company, Cleveland, Ohio, a corporation of Ohio No Drawing. Original application August 23, 1929, Serial No. 387,932. Divided and this application September 8, 1933, Serial No. 688,610

14 Claims. (Cl. 44—9)

Where petroleum is subjected to pyrogenetic decomposition, as for instance in the modern processes of cracking gas oil and the like, there is found to be a tendency for the products to develop more or less gum formation, such gum becoming manifest on evaporation, and occasionally tending to give trouble by depositing in the intake manifold, on the valves and valve stems, of engines using such material for fuel. This gum formation tendency in certain instances is found to be accentuated on prolonged storage. An effective means for preventing or inhibiting such condition is fundamentally important and highly desirable; and in accordance with the present invention products may be had which highly satisfactorily meet such needs.

To the accomplishment of the foregoing and related ends, the invention, then, consists of the features hereinafter fully described, and particularly pointed out in the claims, the following description setting forth in detail certain embodiments of the invention, these being illustrative however, of but a few of the various ways in which the principle of the invention may be employed.

In proceeding in accordance with my invention, the cracked petroleum distillate, such as is of the character prone to develop gum-formation, is subjected to the action of an organic compound inhibitive of such tendency and result. As such treating compound there may be employed a hydroxy compound, more particularly a benzene derivative or benzene homologue derivative with a hydroxyl in the ortho position and another hydroxyl or amino group, or a double ring compound with a hydroxyl in the alpha position. A di-hydroxy phenol, as catechol, or a tri-hydroxy phenol, as pyrogallol, or a naphthalene derivative as α-naphthol, or anthracene derivatives, as anthragallol, may be particularly well employed. Such anti-gumming treating agents may be for convenience and conciseness hereinafter designated as organic gum-inhibiting agents of composition conforming to a type formula HO.RX, in which HO is a hydroxyl in ortho or alpha position and RX is a cyclic radical of single or double ring. Desirably the petroleum treated is neutral or basic.

The amount of such agent required is small, for instance 0.0004 to 0.5 per cent. In general, therefore, it is not necessary to exceed one-half of one per cent., or at the outside one per cent. Since these agents are in some instances solid compounds, a desirable method of incorporating the material into the petroleum distillate may involve first dissolving or incorporating the agent with a suitable solvent, for instance conveniently, ether, ethyl alcohol or methyl alcohol, benzol or the like, and such solution may then be mixed with the petroleum. For effective proportional mixing, while the proper amount for a charge for a given batch of the petroleum may be simply added in bulk to the petroleum in a container, and the mixture be suitably agitated to a good degree of dissemination, preferably I incorporate the liquid to be added, by a proportional feeding of the same into a flowing stream of the petroleum.

A basic compound, especially an organic base, is also desirably added in many cases. Thus, a hydroxy compound, or more particularly a di-hydroxy benzene derivative, and a basic material, preferably an organic base, as anilin or analogous compound, o-toluidin, di-methyl anilin, etc., may advantageously be used in conjunction with each other.

As an illustrative example: 27.5 lbs. of α-naphthol is dissolved in ether to make up substantially ten gallons volume. This is then charged through a feeder and is so fed while 2500 barrels of gasoline is forwarded through a pipe line.

As another example: 15 lbs. of pyrogallol and 25 lbs. of anilin are dissolved in a solvent to make up substantially ten gallons volume, and this is fed proportionally into 2500 barrels of gasoline.

Similarly, as indicated, any of the various agents contemplated, whether hydroxy or di-hydroxy phenols in ortho position, tri-hydroxy phenols, naphthols, anthracene hydroxyl derivatives, etc., can be incorporated, and cracked distillates be so treated, and with a resultant inhibition of the tendency of the gum-formation when partially or completely evaporated in the presence of small amounts of iron or copper, and with avoidance of such gums as tend to run down valve stems and cause sticking of valves in internal combustion engines.

This application is a division of my prior application Serial No. 387,932, filed August 23, 1929.

Other forms of applying the principle of my invention may be employed instead of the one explained, change being made as regards the details disclosed, provided the features set forth in any of the following claims, or the equivalent of such stated features be employed.

I therefore particularly point out and distinctly claim as my invention:—

1. As a new product, a motor fuel of cracked petroleum distillate treated with a dihydroxy aromatic compound with one ring and a gasoline soluble organic base comprising a monocyclic aromatic amine.

2. As a new product, a motor fuel of cracked petroleum distillate treated with catechol and a gasoline soluble organic base comprising a monocyclic aromatic amine.

3. A process of the character described, which comprises inhibiting gum formation in motor fuel, by subjecting such motor fuel to the action of a dihydroxy aromatic compound with one ring and a gasoline soluble organic base comprising a monocyclic aromatic amine.

4. A process of the character described, which comprises inhibiting gum formation in motor fuel, by subjecting such motor fuel to the action of catechol and a gasoline soluble organic base comprising a monocyclic aromatic amine.

5. As a new product, a motor fuel of cracked petroleum distillate treated with a di-hydroxy phenol and an amine, petroleum soluble and of basic property of the group consisting of aniline, o-toluidin, and di-methyl-anilin.

6. As a new product, a motor fuel of cracked petroleum distillate treated with catechol and an amine, petroleum soluble and of basic property of the group consisting of aniline, o-toluidin, and di-methyl-anilin.

7. As a new product, a motor fuel of cracked petroleum distillate treated with a di-hydroxy phenol and anilin.

8. As a new product, a motor fuel of cracked petroleum distillate treated with catechol and anilin.

9. A process of the character described, which comprises inhibiting gum-formation in cracked petroleum distillate motor fuel by subjecting such motor fuel to the action of a di-hydroxy phenol and an amine, petroleum soluble and of basic property of the group consisting of aniline, o-toluidin, and di-methyl-anilin.

10. A process of the character described, which comprises inhibiting gum-formation in cracked petroleum distillate motor fuel by subjecting such motor fuel to the action of catechol and an amine, petroleum soluble and of basic property of the group consisting of aniline, o-toluidin, and di-methyl-anilin.

11. A process of the character described, which comprises inhibiting gum-formation in cracked petroleum distillate motor fuel by subjecting such motor fuel to the action of a di-hydroxy phenol and anilin.

12. A process of the character described, which comprises inhibiting gum-formation in cracked petroleum distillate motor fuel by subjecting such motor fuel to the action of catechol and anilin.

13. A process of the character described, which comprises inhibiting gum-formation in cracked petroleum distillate motor fuel by dissolving in a solvent a di-hydroxy phenol and an amine petroleum-soluble and of basic property of the group consisting of aniline, o-toluidin, and di-methyl-anilin and proportionally mixing such solvent into the motor fuel.

14. A process of the character described, which comprises inhibiting gum-formation in cracked petroleum distillate motor fuel by dissolving in a solvent catechol and an amine petroleum-soluble and of basic property of the group consisting of aniline, o-toluidin, and di-methyl-anilin and proportionally mixing such solvent into the motor fuel.

JOHN P. SMOOTS.